(No Model.)
S. A. PIPER.
CENTERING TOOL.
No. 506,722. Patented Oct. 17, 1893.
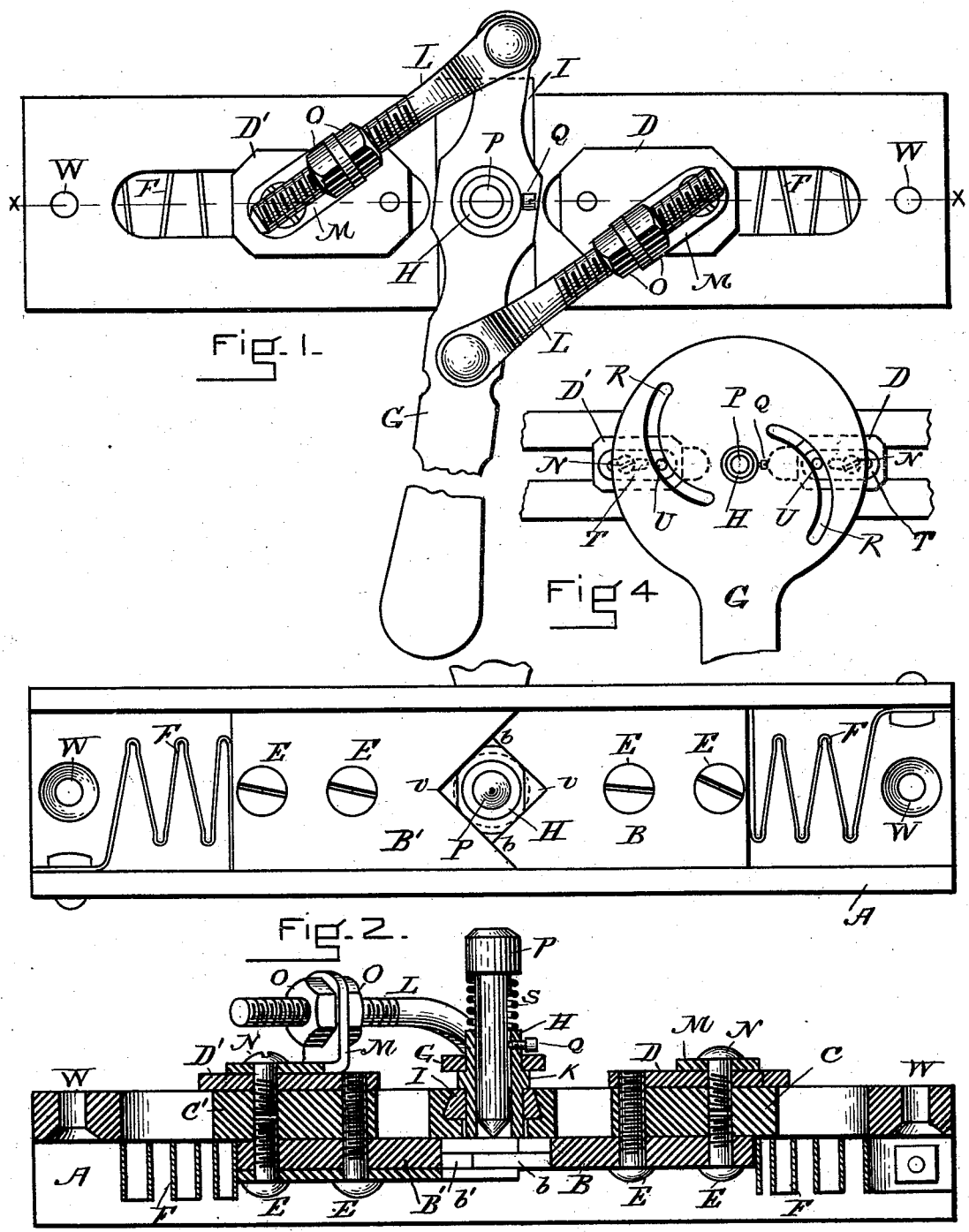
WITNESSES
A. J. Burrow
T. J. Cunningham
INVENTOR
Samuel A. Piper

UNITED STATES PATENT OFFICE.

SAMUEL A. PIPER, OF NEWTON, MASSACHUSETTS.

CENTERING-TOOL.

SPECIFICATION forming part of Letters Patent No. 506,722, dated October 17, 1893.

Application filed April 8, 1893. Serial No. 469,513. (No model.)

*To all whom it may concern:*

Be it known that I, SAMUEL A. PIPER, of Newton, in the county of Middlesex and State of Massachusetts, have invented certain new and useful Improvements in Centering-Tools, of which the following is a specification.

My invention consists in the employment of one or more springs to close the centering jaws and keep them in close contact with the rod while the centering punch is forced against the end of such rod, also in making the centering punch adjustable laterally and the centering jaws longitudinally of the guide-frame, and in pivoting the lever which operates the centering jaws preferably, upon a sleeve around the centering punch, or in such a position that the axis of its pivot will be coincident with the axis of the centering punch.

The improvements will be readily understood by reference to the drawings wherein—

Figure 1, is a plan view of my improved centering device. Fig. 2, is a view, the reverse of Fig. 1; Fig. 3, a longitudinal vertical section on line X—X, Fig. 1; Fig. 4, a plan view of a modified form of operating lever.

Referring to the drawings by designating letters, A is the guide-frame which supports and directs the sliding jaws B, B'. These jaws are, in the specific form illustrated, supported in the guide frame A by blocks C, C' which fit into slots in the upper portion of that frame, and plates D, D' which rest upon the top of the guide-frame, and the respective jaws, blocks and plates are held together by screws E, E. The respective blocks and plates, or blocks and jaws, may be made integral, instead of in separate pieces as shown. The gripping end of each jaw is cut V shaped with the apex of the angle *v*, at the middle of the jaws, and the jaw B' is made thicker than B and slotted laterally at *b'*, so as to receive the points *b* of the jaw B, when the two are forced together.

F, F, are springs one end of each of which is fastened to the guide-frame and the other ends bear upon one of the jaws, thus tending constantly to force their gripping ends together. A lever G, is pivoted upon a sleeve, H, which may be screwed into or otherwise secured to a piece I, which is dovetailed and fitted to a groove which is its counter part, and is cut laterally in the top of the guide-frame, where it may be adjusted and held in place by clamping screws. As illustrated, the plates D, D', project above the surface of the guide-frame, and I have therefore provided a collar K upon the sleeve H of the same thickness as the said plates, so that the lever G may have a position above them.

By means of arms or links L, one end of each of which is pivoted to the lever G, but upon diametrically opposite sides of its pivot, and the other end of each of which is pivoted to one of said jaws B, or the plates D, D' attached thereto, the said jaws may be forced apart, by moving the handle of the said lever to the right. And for the purpose of adjusting the jaws longitudinally of the guide-frame to compensate for the wear of their gripping surfaces, or other parts of the tool, in order to insure accuracy in the position of the jaws with relation to the centering punch, I form the arms L in two parts and connect them by a screw, so that they can be lengthened or shortened as desired. In the specific construction illustrated, an angular piece M is held upon each of the plates D, by means of a screw N, through one portion thereof, allowing the piece M to turn upon the neck of the screw, and the arm L is passed through a hole in the other portion of the angular piece, and held there securely by means of a nut O, upon either side of the piece M, which nuts may be turned upon a screw thread cut upon the end of each arm.

The centering punch P passes through the sleeve H, and is held in the raised position shown in Fig. 3 by means of a spiral spring S placed between the head of the punch P and the top of the sleeve H, and the punch P is prevented from being accidentally or unintentionally withdrawn, by a screw Q, the point of which projects into a groove in the side of the punch.

The hole in the top of the guide-frame A, through which the sleeve H projects, is elongated sufficiently laterally, as shown in Fig. 2, to allow for the proper adjustment of the centering punch, as heretofore mentioned.

In the modified form of connection between the operating lever G and the jaws B, shown in Fig. 4, the lever is enlarged into a disk, around its pivot, and curved slots R, are cut in the enlarged portion. In place of the angular pieces M, slotted pieces T are held upon the plates D, by the screws N and at the opposite ends of the pieces T, pins may project upward carrying small friction rolls U, which run in the curved slots R. By this means, the same as in Fig. 1, when the handle of the lever is moved to the right the jaws B, B', will be forced apart against the action of the springs F. In this modified construction, the jaws may be adjusted with relation to the centering punch by means of the slots in the pieces T and the screws N. The holes W, in the guide-frame are intended for screws to hold it upon a stand, or to secure it in any convenient position desired.

There is a great advantage in the use of a spring to hold the jaws in contact with the rod which is to be centered, while the centering punch is being struck, over the construction heretofore employed, in which a ratchet and pawl is used for the purpose; for the reason that the spring will accommodate itself to any variation or irregularity while the teeth of the ratchet cannot, for the practical purposes of such a tool, be made fine enough to accomplish this, and therefore in the old construction it would often happen that the jaws would not be in firm contact with the rod when the centering punch struck it, and consequently it would be marked inaccurately, and further, a tool in which a spring is used to open the centering jaws does not accomplish the desired object, nor serve the purpose of my improved construction.

I claim—

1. In a centering tool, the combination of a pair of sliding jaws, a guide to sustain and direct said jaws, one or more springs to close the jaws, a lever upon a pivot whose axis is coincident with that of the centering punch, and means to connect the respective jaws with said lever upon diametrically opposite sides of its pivot, substantially as described.

2. In a centering tool, the combination of a pair of sliding jaws, a guide to sustain and direct said jaws, and a centering punch provided with means to adjust it laterally of said guide substantially as described.

3. In a centering device, the combination of a pair of sliding jaws, a guide to sustain and direct said jaws, a pivoted lever whose axis of rotation is coincident with the axis of the centering punch and adjustable connections between the respective jaws and the said lever at points upon diametrically opposite sides of its pivot, substantially as described.

4. In a centering device, the combination of a pair of sliding jaws, a frame to sustain and guide said jaws and support the centering punch, means for adjusting said punch laterally of said frame, a lever to operate said jaws and connections between it and the respective jaws by which each may be adjusted longitudinally of its guide substantially as described.

SAMUEL A. PIPER.

Witnesses:
A. J. BURROW,
T. J. CUNNINGHAM.